United States Patent [19]
Ilnyckyj et al.

[11] 3,765,849

[45] Oct. 16, 1973

[54] FLOW IMPROVERS FOR HYDROCARBON OILS AND METHOD OF PREPARING SAME

[75] Inventors: Stephan Ilnyckyj, Maplewood; Thomas Joseph Wallace, Whippany, both of N.J.

[73] Assignee: Esso Research and Engineering Company, Linden, N.J.

[22] Filed: July 7, 1971

[21] Appl. No.: 160,520

[52] U.S. Cl.............. 44/62, 44/70, 252/56 R, 252/56 D, 260/78.4 E
[51] Int. Cl. .............. C10m 1/26, C10l 1/18
[58] Field of Search............ 252/56 R, 56 D; 44/62, 70

[56] References Cited
UNITED STATES PATENTS 2,936,300  5/1960  Tutwiler et al. ............ 252/56 D X
2,491,683  12/1949  Munday et al. ............ 252/56 D

FOREIGN PATENTS OR APPLICATIONS 525,422    5/1956  Canada
1,154,966  6/1960  Great Britain
1,197,474  7/1970  Great Britain Primary Examiner—Daniel E. Wyman
Assistant Examiner—W. Cannon
Attorney—David A. Roth et al.

[57] ABSTRACT

Copolymers of vinyl ester and an ester of a dialkyl unsaturated dicarboxylic acid prepared by partial transesterification of a short chain alcohol ester of said dicarboxylic acid with a $C_{20}$ to $C_{30}$ alcohol are flow improvers in residual and crude oils.

2 Claims, No Drawings

FLOW IMPROVERS FOR HYDROCARBON OILS AND METHOD OF PREPARING SAME

BACKGROUND OF THE INVENTION

Mineral oils having no wax modifiers and containing paraffin wax have the characteristics of suddenly congealing when the temperature of the oil decreases to a certain point. This loss of fluidity is due to the crystallization or precipitation of wax into plate-like crystals which eventually form a spongy mass entrapping the oil therein.

It is well known that on cooling of liquid paraffinic petroleum products a separation of waxes occurs. A temperature 5°F. higher than that at which oil ceases to flow (solid point) is referred to as the pour point according to ASTM D-97. The pour points of petroleum oils vary widely, for example, some oils solidify far below zero while others freeze at temperatures up to 80° or 120°F. by virtue of their wax content along. It is obvious, therefore, that the pour point is critical with regard to the flow characteristics and, consequently, high pour points adversely affect the storage, mixing, pumping, etc. of such oil. Thus, pour point characteristics are significant to the design and/or operation facilities for the storage, heat exchange, pumping, filterability, etc. of the oil. Naturally, an oil having a high flow point, e.g. crudes having flow points above 55°F. and residual fuels having flow points above about 100°F. would provide a serious problem relative to the design of the facilities mentioned above.

Typical examples of petroleum oils which exemplify the undesirable characteristic of having a flow point above about 100°F. are the residual fuel oils set forth in the following Table I:

in order to reduce their pour points and/or viscosities.

In several patents such as British 1,197,474; British 804,029; British 806,906 and British 891,281, the use of dialkyl dicarboxylates of specific alkyl chain lengths as monomers in a polymer having wax modifying ctivity is disclosed. These polymers are especially useful in lowering the pour points of crude oils and resids.

In particular, British 891,281 is of interest since it shows the preparation and use of a dialkyl fumarate having different alkyl group lengths made by transesterification.

The invention described herein is an improvement over the art of this type.

BRIEF SUMMARY OF THE INVENTION

It has been found and forms the substance of this invention that polymeric flow improvers can be made from alkyl esters of dicarboxylic acids of the general formula $$ROOC-A-COOR'$$

wherein A is a hydrocarbon moiety containing olefinic substitution, R' is a $C_{1-5}$ alkyl group and R is a $C_{20}$ to $C_{30}$ alkyl group which are prepared by transesterification. One of the alkyl substituents is prepared from a relatively long chain alcohol, i.e., a $C_{20}$–$C_{30}$ alcohol preferably $C_{20}$–$C_{24}$ which is relatively expensive and the other alkyl is a short chain $C_1$–$C_5$ alkyl substituent which is relatively inexpensive. The resulting monomeric unsaturated ester having one alkyl group relatively short, i.e., $C_1$–$C_5$ and one alkyl group relatively long, i.e., $C_{20}$ to $C_{30}$ is used for subsequent polymerization and the novel polymers resulting therefrom are used to make improved flow petroleum compositions.

TABLE I

| | \multicolumn{9}{c}{Petroleum residual oils} |
|---|---|---|---|---|---|---|---|---|---|
| | 1 | 2 | 3 | 4 | 5 | 6 | 7 | 8 | 9 |
| Location | \multicolumn{6}{c}{Libya} | Nigeria | Venezuela | Sumatra |
| Field | Brega | Mabruk | Raguba | Dahra | Bomu | Ebubu | Oloibiri | San Joaquin | Minas |
| Flow points of residual (° F.) | 105 | 110 | 100 | 95/100 | 100+ | 100+ | 100+ | 100+ | 115 |
| Degrees FVT cut point of residual | 680+ | 680+ | 650+ | 650 | 650 | 650 | 650 | 650 | 650 |

[1] FVT means degrees Fahrenheit initial vapour temperature.

It should be noted that although the present invention is directed to a range of petroleum oils, special reference is made to high pour point oils, e.g., residual fuel oils boiling above 650°F. and having a flow point above 60°F. These oils have represented a particular problem in the past. Particular reference is made to the residuum of a North African crude identified above as Brega residuum which contains about 15–20 wt. percent wax. This wax content includes waxes of relatively high molecular weight, e.g, from about $C_{25}$ and greater, which especially give rise to the above-mentioned problems, i.e. the transporting, storing, etc. of this kind of heavy oil.

While such Brega residuum typifies the kind of high wax content fuel oils which exemplify undesirable flow properties and the like, such residuum is, in fact, a premium oil as compared to other crude residua which have much lower pour points. Resids are very frequently diluted with No. 2 distillates or heavy naphthas

DETAILED DESCRIPTION OF THE INVENTION

The art has recognized in recent years that the length of the side chain in a polymeric backbone has a controlling influence on the ability of a polymer to modify wax crystals. As a result, the use of long chain, alkyl esters of dicarboxylic acids such as fumarates has become conventional in copolymers with other monomeric materials.

The alcohols from which the long chain alkyl substituents are derived are very expensive. It is an advantage of this invention that dicarboxylates are utilized which have only one long chain alkyl. Considerable activity can be observed from a given polymer when the dicarboxylate contains only one long chain alkyl. Accordingly, applicants have prepared dicarboxylates containing only one long chain alkyl and have incorporated them in polymeric compositions. These polymeric compositions have then been used to form new and improved petroleum compositions.

Specifically, a copolymer of a mixed dialkyl dicarboxylate prepared from behenyl alcohol is combined with vinyl acetate as a comonomer to form novel polymers. Novel petroleum compositions containing such polymers have been made at a considerably lower cost than that of the conventional dialkyl dicarboxylate in which two long chain alkyls have been used.

The dialkyl carboxylate of the invention is a fully-esterified composition ROOC—A—COOR' containing substantially no free unreacted carboxyl groups, wherein A is a hydrocarbon moiety containing olefinic unsaturation, R is a $C_{20}$–$C_{30}$ saturated hydrocarbon moiety, and R' is a $C_1$–$C_5$ alkyl group. It is prepared by a transesterification process which comprises reacting ROH with R'OOC—A—COOR' to form a reaction mixture, substantially free of unreacted carboxyl groups which contains major portions of R'OOC—A—COOR. The reaction mixture can contain by-products such as R'OH, R'OOC—A—COOR' and ROOC—A—COOR.

In the composition R'OOC—A—COOR', A is defined as a moiety of from two to 10, preferably two to four carbon atoms containing olefinic unsaturation. Typical examples are

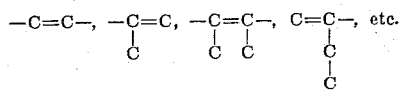

A is preferably chosen so that the ester is derived from a $C_4$ to $C_7$ unsaturated dibasic acid. Examples of such acids include maleic acid, fumaric acid, citraconic acid, mesaconic acid, itaconic acid, aconitic (tricarboxylic) actylenedicarboxylic (equivalent to olefin unsaturation for the purposes of this invention.) Although R' may be n-propyl, isopropyl, or ethyl, it is preferred that R' be methyl. Illustrative reactant diesters include di-isopropyl fumarate; di-n-propyl fumarate; diethyl fumarate; dimethyl fumarate; methyl, ethyl fumarate; ethyl, propyl itaconate; methyl, butyl citraconate, dimethyl maletate; diethyl maleate; di-isopropyl maleate; methyl, butyl maleate; dimethyl methyl-maleate; etc. Dimethyl fumarate and diethyl fumarate are preferred.

Generally R is a $C_{20}$–$C_{30}$ preferably $C_{20}$ to $C_{24}$ alkyl radical. Examples of alcohols from which R is obtained include: nonadecyl, eicosyl, heneicosyl, docosyl, tricosyl, tetracosyl, pentacosyl, hexacosyl, heptacosyl, octacosyl, noncosyl and triacontyl. In general, the R group should not be substituted since substituents on the polymethylene segments tend to interfere with the ability of the alkyl groups to interact with the wax. The R group should not contain unsaturation.

Most preferably ROH is a hydrogenated fish oil fraction marketed under the trade name "Behenyl". It is a mixture of alcohols consisting primarily of docosyl alcohol, but containing minor amounts of $C_{16}$ to $C_{24}$ alcohols. For convenience herein, the term behenyl alcohol shall mean docosyl alcohol, i.e., $CH_3(CH_2)_{21}OH$.

In the preferred process embodiments ROH is reacted with R'OOC—A—COOR' in a tranesterification reaction, e.g.

ROH + R'OOC—A—COOR' → R'OH + ROOC—A—COOR'   (I)

It is a feature of this invention that ROH is reacted in quantities up to but less than 2:1 molar ratio with R'OOC—A—COOR' to form up to one mole of ROOC—A—COOR' which can be substituted mole for mole for ROOC—A—COOR in a polymerization reaction and the subsequent polymer.

For the process, the mixture is reacted at a temperature below the boiling point of ROH, the higher boiling alcohol, and above the boiling point of R'OH, the lower boiling alcohol, during which time much of the lower boiling R'OH will distill out of the reaction mixture. Typical reaction temperatures will range from 80° to 150°C.

Variably, the reaction is carried out until the calculated amount of R'OH is recovered as overhead. The reaction can be carried out in the presence of inert solvent, such as hydrocarbons, e.g. xylene, n-heptane. Any suitable solvent can be used but preferably it will have a boiling point below the boiling point of ROH and above the approximate boiling point of R'OH. Usually the product contains no free unreacted carboxyl groups.

The esterification catalyst utilized in the method of this invention may be any conventional esterification catalyst. Such catalysts are well known to the art and include the following:

Sulfuric acid
Sodium hydrogen sulfate
p-Toluene sulfonic acid
Sulfosalicylic acid The amount of catalyst utilized in the reaction is preferably about 0.1 to 1 percent by weight, based on the total reactor charge.

The reaction is carried out at an elevated temperature such as a temperature in the range of about 70° to 300°C.; preferably a temperature in the range of about 150° to 250°C. is employed. The reaction is carried out for a period of time sufficient to convert at least a portion of the starting ester into a short chain free alcohol product and a mixed diester product. Preferably the reaction is carried out until substantially all of the ester has been transesterified into the mixed diester product and alcohol product. The reaction time required to accomplish this will depend upon the batch size and will generally be in the range of about 0.5 to 6 hours.

Analysis of the reaction product of several actual preparations indicates that the yields obtained are substantially stoichiometric; and the free carboxyl content of the product is negligible.

Methyl, behenyl fumarate or methyl-behenyl fumarate, i.e. the mixed ester of fumaric acid with behenyl alcohol and with methyl alcohol — also called monomethyl, monobehenyl fumarate: $(C_{22}H_{45})OOC—CH=CH—COO(CH_3)$ is a particularly preferred monomeric ester as is the mixed ester methyl behenyl maleate.

The advantages of synthesizing the monomer in this manner in addition to cost savings are the high degree of purity, stoichiometric yields and freedom from free-carboxyl groups.

It is a feature of this invention that the mixed ester ROOC—A—COOR' can be polymerized as is or alternatively it may be mixed with other polymerizable monomers and the mixture polymerized.

It will be apparent that when the reaction of equation (I) is carried out using between one to two moles of ROH per mole of R'OOC—A—COOR', the reaction mixture will contain ROOC—A—COOR' and ROOC—A—COOR - and that this mixture may be employed in the practice of this invention. Typically the mixture may contain $a$ moles of ROOC—A—COOR per $(1-a)$ moles of ROOC—A—COOR' where $a$ is 0 to 0.99, preferably 0.15 to 0.75, even more preferably 0.15 to 0.50. Any replacement of the expensive R group by the cheaper R' group will decrease the cost (and unexpectedly exert little undesirable effect on the properties of the resultant polymer.)

Although possible to make short chain homopolymers, long chain copolymers are preferred. Such a polymerization process utilizes a reaction mixture containing a free radical initiator. The reactants preferably comprise a. ROOC—A—COOR' and a monomer selected from the group consisting of:

b. $CH_2$=CHOOCR'' wherein R'' is selected from the group consisting of hydrogen, and $C_1$ to $C_{50}$ alkyl, aralkyl, alkaryl, and aryl.

When R'' is alkyl or cycloalkyl, it may be methyl, ethyl, propyl, i-propyl, n-butyl, i-butyl, t-butyl, hexyl, cyclohexyl, octyl, etc. When R'' is aryl, it may be phenyl naphthyl, etc. When R'' is alkaryl, it may be tolyl, xylenyl, etc. More preferably, R'' is alkyl, and even more preferably, $C_1$ to $C_{10}$ alkyl groups. Preferably R'' may be methyl. Preferred specific vinyl monocarboxylic esters $CH_2$=CH-OOCR'' include vinyl acetate, vinyl propionate, vinyl benzoate, vinyl cyclohexanoate, etc. Vinyl acetate is particularly preferred.

c. Other unsaturated compounds represented by the formula

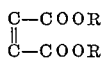

wherein R is a $C_1$ to $C_{18}$, preferably $C_1$ to $C_8$ alkyl d. An ethylenically unsaturated compound represented by the formula

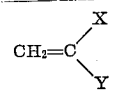

wherein X is H, halogen, $C_1$ to $C_5$ alkyl, Y is halogen, $C_2$ to $C_{20}$ alkoxy, —CN or —COOR wherein R is hydrogen or $C_1 - C_{30}$, preferably $C_1$ to $C_{24}$ alkyl e. A $C_2$ to $C_{60}$, preferably $C_2$ to $C_8$ $\alpha$-olefin hydrocarbon. Isobutylene is a good representative example.

The monomers described in the preceding paragraphs are polymerized in a conventional manner to produce the polymers useful in the present invention. For example, the polymerization reaction may be carried out without diluent but preferably in a solution of a hydrocarbon solvent such as heptane, benzene, cyclohexane or white oil at a temperature in the range of from 60° to 250°F. and may be promoted by gamma radiation or by means of a peroxide type catalyst such as benzoyl peroxide, lauryl peroxide, di-t-butyl peroxide, a hydroperoxide such as t-butyl hydroperoxide or an azo catalyst such as alpha - alpha' - azo - bis-isobutyronitrile. It is generally preferred to carry out the polymerization reaction under a blanket of an inert gas such as nitrogen or carbon dioxide vary in order to exclude oxygen. The polymerization time may vary from 1 to 36 hours.

The polymers of this invention will have a viscosity average molecular weight in the range of from 500 to 100,000 or higher, i.e. the upper range is limited only by the polymer oil solubility. It is preferred, however, that the molecular weight be within the range between 1000 and 30,000, most preferably 2,000 to 10,000.

The amount of comonomer present in the copolymers of this invention as compared to the amount of long chain dicarboxylate esters present is in the range from 10 to 90 mole percent, the preferred range being from 25 to 75 mole percent and most preferred is about 50 mole percent. Inasmuch as the ester linkage, polymer backbone and requisite side chain length are related to the polymer activity, the long chain monomers of this invention may be polymerized together in any portion desired (i.e., 1–100 mole percent) to secure the maximum potency in a given base stock.

The final additive polymers of this invention may be blended directly with the wax containing residual fuel, residua-containing fuel, crude oil or middle distillates. Polymer concentration within the range of from 0.0025 to 2.0 wt. percent based on weight-containing oil are suitable and will give the desired improvement in flow characteristics. Based on economic as well as flow modifying reasons, from 0.003 to 0.45, i.e. .003 to 0.1 wt. percent of the polymer is preferably employed.

The polymeric additives of this invention are found compatible with other additive materials and may, if desired, be blended with petroleum oils containing minor amounts of viscosity index improvers, rust inhibitors, oiliness agents, and oxidation inhibitors.

The additives of this invention also exhibit utility as a dewaxing aid. For example, admixtures of the polymers of this invention with a wax-containing oil may be processed by chilling the admixture in any suitable manner to a wax precipitation temperature, e.g., from about −30°F. to about +20°F. The precipitated wax may then be removed by centrifugation or filtration, preferably the latter. Particularly desirable results are obtained in the conventional solvent dewaxing process wherein the oil, dewaxing aid and dewaxing solvent are admixed at elevated temperatures to form a solution which may then be dewaxed in the manner set forth above. In general, it has been found that solvent dewaxing feeds comprising the hereinbefore specified amount of polymer, from 50 to 90 wt. percent of the dewaxing solvent and from 10 to 50 wt. percent of the wax-containing oil can be easily and efficiently filtered in conventional dewaxing filtration equipment. Examples of suitable solvents include benzene or toluene with ketones, such as acetone, methylethyl ketone, methylisobutyl ketone, propane, hexane, ethylene dichloride, aliphatic alcohols, naphtha and mixtures thereof.

It is a feature of the novel copolymerization process of this invention that because of the novel mode of preparing the diester component, it may readily react with the vinyl ester of the monocarboxylic acid to give high yields of product copolymer. The absence of free carboxyl groups (in the diester component) permits attainment of high yield (with ease of recovery) of pure copolymer product. This is totally unexpected and is not a characteristic of prior art components, i.e. prior art dibehenyl fumarate, which as prepared by processes falling outside the invention, contains undesirable quantities of the unreacted behenyl alcohol, unreacted fumaric acid, etc.

During the washing step, their unreacted components form emulsions which are very difficult to separate.

The novel copolymer compositions of this invention may be employed as concentrates, for use in treating petroleum oils to improve the flow properties thereof, the concentrates containing inert diluent-solvent plus copolymer. The diluent-solvent may for example be the inert solvent in which the esterification has been carried out or the inert hydrocarbon in which the polymerization occurs — or a mixture thereof.

Typical inert diluent-solvents, useful in the concentrate, may include petroleum oils such as light lubricating oils, medium lubricating oils, middle distillates, etc., hydrocarbons such as decane, heavy naphtha cuts, etc. Typically, the concentrates may contain 5–50 parts, say 25 parts, of active ingredient and 50–95 parts of inert diluent-solvent. A typical concentrate may contain 75 parts of toluene and 25 parts of the copolymer of the invention. Typical residua-containing petroleum oils which may be treated by the process of this invention may include crude petroleum oils, reduced crude petroleum oils, and fuel oils containing reduced crude petroleum oils. Typical residues may include reduced crudes, residual fuel oils, blends of residual oils with distillates, etc.

It is a particularly unexpected feature of this invention that the presence in the copolymer molecule of the lower-priced R' groups in place of the higher-priced R groups yields in polymers of at least equal efficiency per R group present at up to 50 mole % replacement of long chain dialkyl group.

The invention is further illustrated by the following examples wherein, as elsewhere in this specification unless specifically indicated otherwise, all parts are by weight.

EXAMPLE 1

Preparation of Control Behenyl Fumarate and Copolymer

Two hundred grams of behenyl alcohol, 38 grams of fumaric acid, 500 ml. n-heptane and 5 grams p-toluenesulfonic acid were heated to reflux and the water evolved was collected in a Dean-Stark trap. At the end of a 6 hour period, 11 mls. of water were collected and the reaction completed. The solution was cooled to 50°C. and washed with two 100 ml. portions of sodium carbonate and then with 150 ml. portions of water until a pH of 7 was reached. The heptane solution was then dried over magnesium sulfate, filtered and the solvent removed under reduced pressure. The yield was 95 percent.

One hundred grams of the thus produced behenyl fumarate and 150 ml. n-heptane were charged to a one liter polymer kettle, heated to 60°C. and sparged with nitrogen for a 15 minute period. A solution of 0.8 gram of benzoyl peroxide in 30 grams vinyl acetate (sparged with nitrogen) was then added to the fumarate ester solution and the reaction mixture heated to 85°–90°C. After a period of 9 hours, the fumarate ester was completely converted to polymer, and a 90 percent yield of behenyl fumarate-vinyl acetate copolymer was obtained. The number average molecular weight as determined by osmometry was 20,650.

EXAMPLE 2

Preparation of Mixed Ester Component Fumarate

Forty-three and one-tenth grams of diethyl fumarate, i.e. 0.25 mole grams, 117.4 grams of behenyl alcohol, i.e. 0.375 mole grams and 0.5 grams of toluene sulfonic acid catalyst were charged to a 500 milliliter polymer pot which was equipped with a stirrer, thermometer, condenser and a Dean-Stark trap. During the subsequent transesterification reaction ethanol was collected in the trap and was continually removed and the trap was replenished with water. The reaction was carried out for about 5 hours at temperatures ranging from 115° to 175°C. About an hour before the reaction was terminated, about 75 milliliters of xylene were added to the reaction. This xylene was removed from the reaction mixture by sparging with nitrogen at a temperature of approximately 175°C. The product collected measured 92/cc. which was washed twice with water and the final product after water washing amounted to 85 cc's.

EXAMPLE 3

Preparation of Polymer From Mixed Ester

One hundred grams of the Example 2 partial behenyl fumarate ester and 50 milliliters of hexane were charged to a one-liter polymer kettle heated to a temperature of from 55° to 76°C. for a time period of about 12-½ hours in the presence of an initial 8.75 grams of vinyl acetate with 0.41 grams of benzoyl peroxide which was in the vinyl acetate and subsequently an additional 2.93 grams of vinyl acetate containing 0.14 grams of the benzoyl peroxide catalyst.

After this time period the fumarate ester was completely converted to polymer and the polymer was recovered by blowing the reaction mixture with nitrogen while placed on a steam bath. The yield was 96.65 grams of a fumarate/vinyl acetate copolymer in which the fumarate contained 75 mole percent of behenyl alcohol. Vinyl acetate and alkyl fumarates polymerize in approximately a 1:1 mole ratio.

The number average molecular weight of the resulting polymer was determined by conventional osmometry techniques as 20,671.

EXAMPLE 4

The preparation of partial behenyl fumarates ester described above for Example 2 was repeated exactly except that 86 grams (0.5 gram moles) of diethyl fumarate was used, 78.25 grams (.25 gram moles) of behenyl alcohol (0.25 gram moles) was used and 1.0 grams of toluene sulfonic acid catalyst was used. Also at a point intermediate in the reaction, another 78.25 grams of (.25 gram moles) of behenyl alcohol was added to the reaction. Ultimately 81 cc of the transesterified product was collected.

EXAMPLE 5

The polymerization described above for Example 3 was repeated exactly except that the partial behenyl fumarate ester of claim 4 was used. Another exception was that 11.4 grams of vinyl acetate and 0.18 grams of catalyst respectively were used.

The recovered polymer was subjected to dialysis and was found to have a number average molecular weight of 15,697.

EXAMPLE 6

The preparation described above for Example 2 was repeated except that 2 grams of toluene sulfonic acid catalyst and 50 ml. of xylene were used. Only 46 cc were recovered after water washing. The product was allowed to stand for two weeks. Then, it was washed with water, treated with 5% NaOH solution, washed again until neutral and blown with $N_2$. 136 grams of ester was ultimately recovered.

EXAMPLE 7

The polymerization of Example 3 was repeated exactly except for minor changes in the time of the reaction utilizing the ester of Example 6.

EXAMPLE 8

Testing

Various pour point determinations were made on compositions made up of 0.15 wt. percent of the copolymers of the preceding examples which were blended in Brega Residuum (650°F+) fraction. The pour points were determined substantially according to ASTM-97-57 briefly except with certain heating deviations; briefly the samples were heated to 200°F. in a heating bath and maintained at this temperature for at least one-half hour. Then the sample was divided into four smaller aliquot portion samples which were put in pour test jars. Each of these jars was equipped with a stopper holding a thermometer immersed in the sample. The four samples were then placed in a bath at 120°F. and when they reached this temperature, they were then put in a cooling bath until they reached 0°F.

After reaching 0°F., the four samples were then placed into individual baths until they reached temperatures, i.e. reheate temperatures, of 150°F., 130°F., 115°F. and 100°F. respectively for at least one-half hour. The samples were then taken out and were finally placed in a bath operating at 30°F. and when the temperature on the thermometer showed +50°F., each sample was moved to a 0° to +5°F. bath.

The test was then conducted according to the ASTM D-97 procedure whereby as the samples cooled, they were examined at every 5°F. drop in temperature in order to determine the point at which the sample did not move when it was slightly tilted. When no movement was observed, 5°F. was added to the observed temperature and reported as the pour point.

The highest pour point of the samples was taken as the pour point. Flow point is the highest of the pour points. The results are summarized below in Table I.

TABLE I

| Additive | %AI[1] | W%[2] | M%[3] | Pour point, °F. | | | |
|---|---|---|---|---|---|---|---|
| | | | | 150° | 130° | 115° | 100° |
| None | 0 | 0 | 105 | 105 | 105 | 105 | |
| Ex. 1 (Control) | 0.15 | 77.7 | 100 | 65 | 70 | 70 | 70 |
| Ex. 3 | 0.15 | 71.4 | 75 | 50 | 50 | 60 | 60 |
| Ex. 5 | 0.15 | 57.5 | 50 | 85 | 100 | 85 | 80 |
| Ex. 7 | 0.15 | 71.4 | 75 | 65 | 70 | 70 | 70 |

[1] Percent active ingredient.
[2] W%=wt. percent behenyl alcohol per 100 grams of copolymer.
[3] M%=mole percent behenyl alcohol in the fumarate monomer.

As can be seen from the above table, replacing half the behenyl alcohol group on a mole basis results in a polymer with reasonable activity. Replacement of 25 mole percent of the behenyl alcohol results in a copolymer that has properties at least comparable to the polymer containing 100 mole percent behenyl alcohol ester.

The data for Example 3 suggest that lower weight percent treats would give comparable results to the control because of the greater number of polymer chains in a given weight of the Example 3 polymer.

That Example 7 appears to be somewhat less effective than Example 3 can probably be attributed to the long shelf time before all the catalyst and the transesterification reaction was neutralized and to the use of excess catalyst.

EXAMPLE 9

Calculations

In order to demonstrate the relative cost savings to be realized by the practice of the invention, the following calculations were performed. The object was to determine the relative ingredient cost per pound of a polymer made by the process of the art and a polymer made by the process of the invention and containing the novel sequences of monoalkylbehenyl alcohol as described in the invention.

Accordingly, it was determined that the pound moles which were necessary for producing the improved polymer assuming a 1:1 mole ratio of ester to vinyl acetate was as summarized in the following Table II.

TABLE II

| Behenyl alcohol | $Cost/lb. | 100 mole percent (Example 2) | | | 50 mole percent (Example 5) | | | 75 mole percent (Example 3) | | |
|---|---|---|---|---|---|---|---|---|---|---|
| | | Mole lb. | Behenyl alcohol 37¢ | Cost 56¢ | Mole lb. | Cost 37¢ | Cost 56¢ | Mole lb. | Cost 37¢ | Cost 56¢ |
| Components: | | | | | | | | | | |
| Vinyl acetate | 11¢ | 86 | 9.46 | 9.46 | 86 | 9.46 | 9.46 | 86 | 9.46 | 9.46 |
| Methanol | .04 | | | | 32 | 1.28 | 1.28 | 16 | .64 | .64 |
| Behenyl alcohol | .37 or .56 | 652 | 241.24 | 365.12 | 326 | 120.62 | 182.56 | 489 | 180.93 | 273.84 |
| Fumaric acid | .20 | 116 | 23.20 | 23.20 | 116 | 23.20 | 23.20 | 116 | 23.20 | 23.20 |
| Total mole lbs | | 854 | | | 560 | | | 707 | | |
| Total cost per mole $ | | | 273.90 | 398.78 | | 154.56 | 216.50 | | 214.23 | 307.14 |
| Total cost per lb. $ of polymer | | 818 | .335 | .487 | 524 | .295 | .413 | 671 | .319 | .457 |
| Relative cost | | | 100 | 100 | | 88 | 85 | | 95 | 94 |

As can be seen from the above Table II, on a cost per pound basis there is an appreciable savings to be realized when the quantity of behenyl alcohol in the polymer is reduced as per the technique of the invention. For instance, savings of $.074 per pound if behenyl alcohol costs $.56 per lb. can have a significant economic impact.

Although vinyl acetate has been discussed as the comonomer of choice other unsaturated monocarboxylic esters can be used. These monomers are in summary:

a. vinyl esters of $C_1$ to $C_{18}$ preferably $C_2$ to $C_8$ monocarboxylic acids b. an ethylenically unsaturated compound

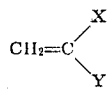

wherein X is H, halogen, or alkyl
Y is halogen or —COOR and
R is hydrogen or $C_1$ to $C_{16}$ preferably $C_2$ to $C_8$ alkyl or aryl.

c. a $C_2$ to $C_{60}$ preferably $C_2$ to $C_8$ α-olefin hydrocarbon. Ethylene or isobutylenes are preferred olefin comonomers. $C_{22}$ to $C_{28}$ alpha olefins are also preferred.

d. an ethylenically unsaturated compound ROOC—A—COOR, wherein R is H or a $C_1$ to $C_{10}$ preferably $C_1$ to $C_4$ alkyl substituent A has from two to 10 carbon atoms. A is preferably chosen so that the total number of carbon atoms in the acid portion of the molecule is from four to seven, i.e.

What is claimed is:

1. An oil composition comprising a major proportion of a wax containing oil improved in its flow properties selected from the group consisting of crude oil, residual fuel, and residua containing fuel, and a minor proportion in the range of about 0.003 to 0.1 wt. percent of a pour point depressing copolymer having a molecular weight in the range of about 500 to 100,000 of a vinyl alcohol ester of a $C_2$-$C_8$ monocarboxylic acid and a dialkyl ester of $C_4$ unsaturated dicarboxylic acid, wherein said dialkyl ester has been prepared by transesterification of a $C_{20}$-$C_{30}$ monohydric alcohol with a diester of said dicarboxylic acid and a $C_1$-$C_5$ monohydric alcohol and wherein about 50 to 75 mole percent of the alkyl groups are derived from the $C_{20}$-$C_{30}$ monohydric alcohol.

2. A composition according to claim 1, wherein said vinyl ester is vinyl acetate, said dicarboxylic acid in fumaric acid, said long chain alcohol is behenyl alcohol, said $C_1$ to $C_5$ alcohol is methanol, and about 75 mole percent of said dialkyl groups of said dialkyl ester are the alkyl groups from behenyl alcohol and about 25 mole percent of said dialkyl groups are the alkyl groups from methanol.

* * * * *